(12) United States Patent
Zhu

(10) Patent No.: US 11,917,982 B2
(45) Date of Patent: Mar. 5, 2024

(54) MULTIFUNCTIONAL PET MANICURE DEVICE

(71) Applicant: Zhehao Zhu, Shenzhen (CN)

(72) Inventor: Zhehao Zhu, Shenzhen (CN)

( * ) Notice: Subject to any disclaimer, the term of this patent is extended or adjusted under 35 U.S.C. 154(b) by 934 days.

(21) Appl. No.: 16/901,216

(22) Filed: Jun. 15, 2020

(65) Prior Publication Data

US 2021/0289913 A1 Sep. 23, 2021

(30) Foreign Application Priority Data

Mar. 19, 2020 (CN) .......................... 202020350541.8

(51) Int. Cl.
| | | |
|---|---|---|
| *A01K 13/00* | (2006.01) | |
| *A45D 29/02* | (2006.01) | |
| *A45D 29/14* | (2006.01) | |
| *B24B 23/02* | (2006.01) | |
| *B24B 55/05* | (2006.01) | |

(52) U.S. Cl.
CPC ............ *A01K 13/00* (2013.01); *A45D 29/023* (2013.01); *A45D 29/14* (2013.01); *B24B 23/02* (2013.01); *B24B 55/052* (2013.01)

(58) Field of Classification Search
CPC ...... A01K 13/00; A45D 29/023; A45D 29/14; B24B 23/02; B24B 55/052
USPC .......................................................... 30/131
See application file for complete search history.

(56) References Cited

U.S. PATENT DOCUMENTS

| | | | | |
|---|---|---|---|---|
| 3,845,553 A | * | 11/1974 | Fields ................... | A01K 13/00 74/57 |
| 7,131,448 B2 | * | 11/2006 | Lund ..................... | A45D 29/02 132/73.5 |
| 7,263,775 B2 | * | 9/2007 | Moulton, III ......... | A01K 13/00 7/162 |
| 7,428,881 B2 | * | 9/2008 | Drelinger .............. | A45D 29/05 119/608 |
| 10,506,796 B1 | * | 12/2019 | Lee ....................... | A01K 17/00 |
| 2006/0042559 A1 | * | 3/2006 | Kang .................... | A45D 29/02 119/600 |
| 2023/0079998 A1 | * | 3/2023 | Zeng .................... | A01K 13/00 119/609 |

* cited by examiner

*Primary Examiner* — Omar Flores Sanchez
(74) *Attorney, Agent, or Firm* — Andrew C. Cheng

(57) ABSTRACT

A multifunctional pet manicure device includes a nail clipper, a main handle and an auxiliary handle. The nail clipper includes a first blade and a second blade, the first blade is rotationally connected with the second blade, the first blade is fixedly connected with the main handle, and the second blade is fixedly connected with the auxiliary handle. The multifunctional pet manicure device further includes a nail polisher, wherein the nail polisher includes a driving member and a polishing head, the polishing head is connected to the driving member, and the driving member drives the polishing head to rotate.

3 Claims, 4 Drawing Sheets

MULTIFUNCTIONAL PET MANICURE DEVICE

TECHNICAL FIELD

The present invention relates to a manicure device, and particularly relates to a multifunctional pet manicure device.

RELATED ART

With the improvement in people's living standards, more and more families are keeping pets in urban and rural areas. Domestic pets, such as cats and dogs, have nails that grow rapidly due to lack of outdoor activity, hence, the pet owners needs to trim their pets' nails regularly, otherwise the nails may hurt people or damage furniture, and the nails can curl onto themselves and hurt the animal's foot pads.

At present, people trim their pets' nails using ordinary scissors. In such a case, it is difficult to distinguish vessels and nerves of the toes, and the pets' nails can be easily injured. After trimming, the nails need to be polished, and a lot of time and labor are wasted. In addition, the scissors and a nail polisher are separate tools, are difficult to use, and there is an urgent need to improve them.

SUMMARY

In order to overcome the limitations of the prior art, the present invention is directed to provide a multifunctional pet manicure device which can not only trim pets' nails but also polish the nails.

A technical scheme adapted to achieve the purpose of the present invention is as follows:

A multifunctional pet manicure device includes a nail clipper, a main handle and an auxiliary handle. The nail clipper includes a first blade and a second blade, the first blade is rotationally connected with the second blade, the first blade is fixedly connected with the main handle, and the second blade is fixedly connected with the auxiliary handle. The multifunctional pet manicure device further includes a nail polisher, wherein the nail polisher includes a driving member and a polishing head, the polishing head is connected to the driving member, and the driving member drives the polishing head to rotate.

Preferably, the multifunctional pet manicure device further includes a nail collection box which is positioned on one side of the nail clipper and used for collecting the nails cut by the nail clipper.

Preferably, the nail collection box is fixed to the end of the main handle.

Preferably, the multifunctional pet manicure device includes a lamp that is positioned on one side of the nail clipper and is capable of lighting the vessels and nerves of the pets' toes, to help prevent the pets' toes from being cut and injured.

Preferably, the lamp is fixed to the end of the main handle.

Preferably, the lamp uses an LED.

Preferably, the nail polisher further includes a polishing head cover used for accommodating the polishing head.

Preferably, the nail polisher further includes a cover which is detachably connected with the end of the main handle; and the polishing head cover is accommodated within the cover.

Preferably, the nail polisher further includes a battery and a switch; the battery is accommodated within the main handle and is electrically connected with a driving member; and the switch is movably mounted to the main handle and is connected with the battery.

Preferably, the multifunctional pet manicure device further includes an electric assembly; the electric assembly includes two positioning columns and an elastic member; the two positioning columns are correspondingly mounted to the main handle and the auxiliary handle; and two ends of the elastic member correspondingly sleeve the two positioning columns.

Compared with the prior, the multifunctional pet manicure device provided by the present invention includes the nail clipper capable of cutting the nails, and the nail polisher capable of polishing the nails and is convenient to use and carry; the lamp is capable of lighting the nail-cutting part, thus the vessels and nerves of the pets' toes can be seen and the pets' toes can be prevented from being cut and injured; and after being cut off, the nails can be accommodated within the nail collection box, so that the cut nails are prevented from scattering.

In Figs., 10, nail clipper; 11, first blade; 12, second blade; 20, main handle; 30, auxiliary handle; 40, nail polisher; 41, battery; 42 driving member; 43, polishing head; 44, polishing head cover; 45, cover; 46, switch; 50, lamp; 60, nail collection box; 70, elastic assembly; 71, positioning column; 72, elastic member.

DETAILED DESCRIPTION OF THE PREFERRED EMBODIMENTS

In order to describe the objects, the technical schemes and the advantages of the present patent application more clearly, the present patent application is further explained in detail with reference to the accompanying drawings and an embodiment. However, it is to be appreciated that the following description of the embodiment is merely exemplary in nature and is no way intended to limit the present patent application.

Figure 1:
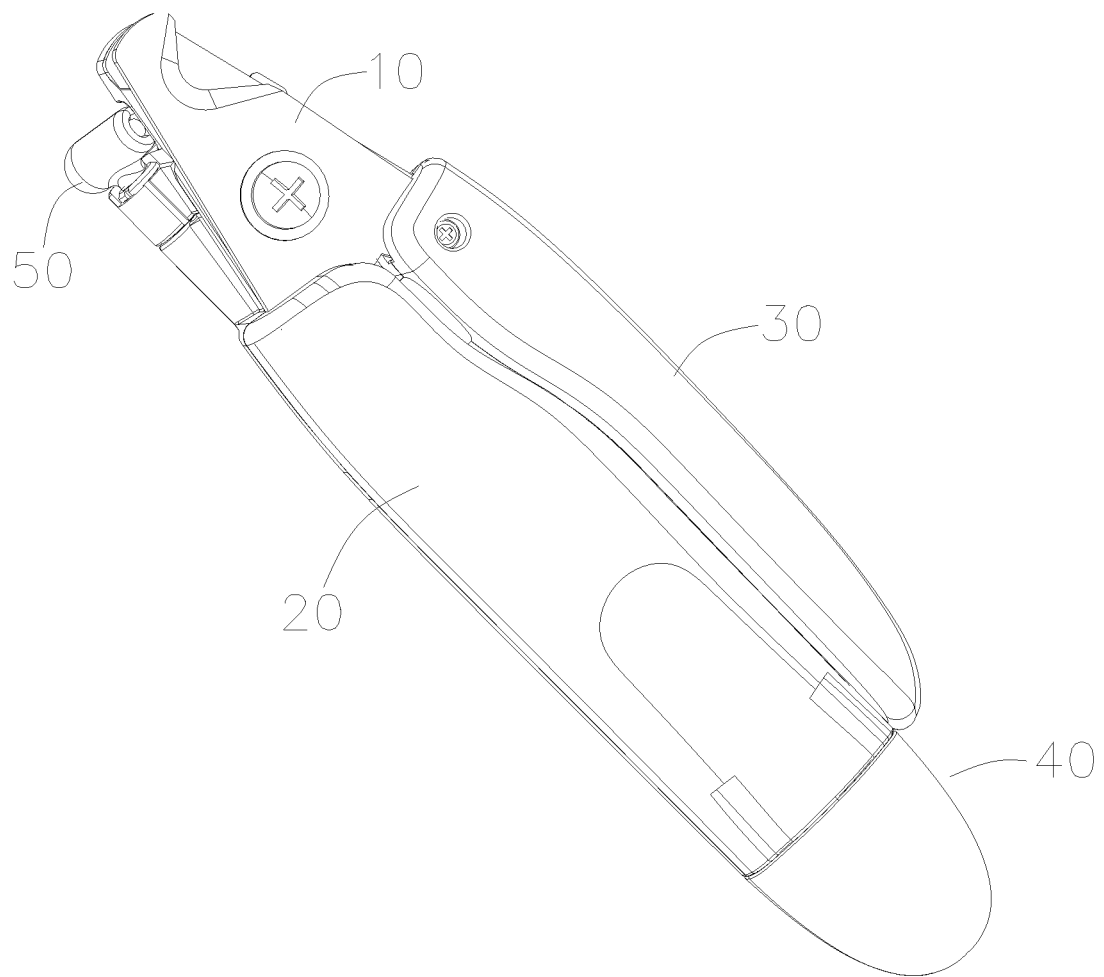
FIG. 1 is a perspective view of a multifunctional pet manicure device.
Figure 2:
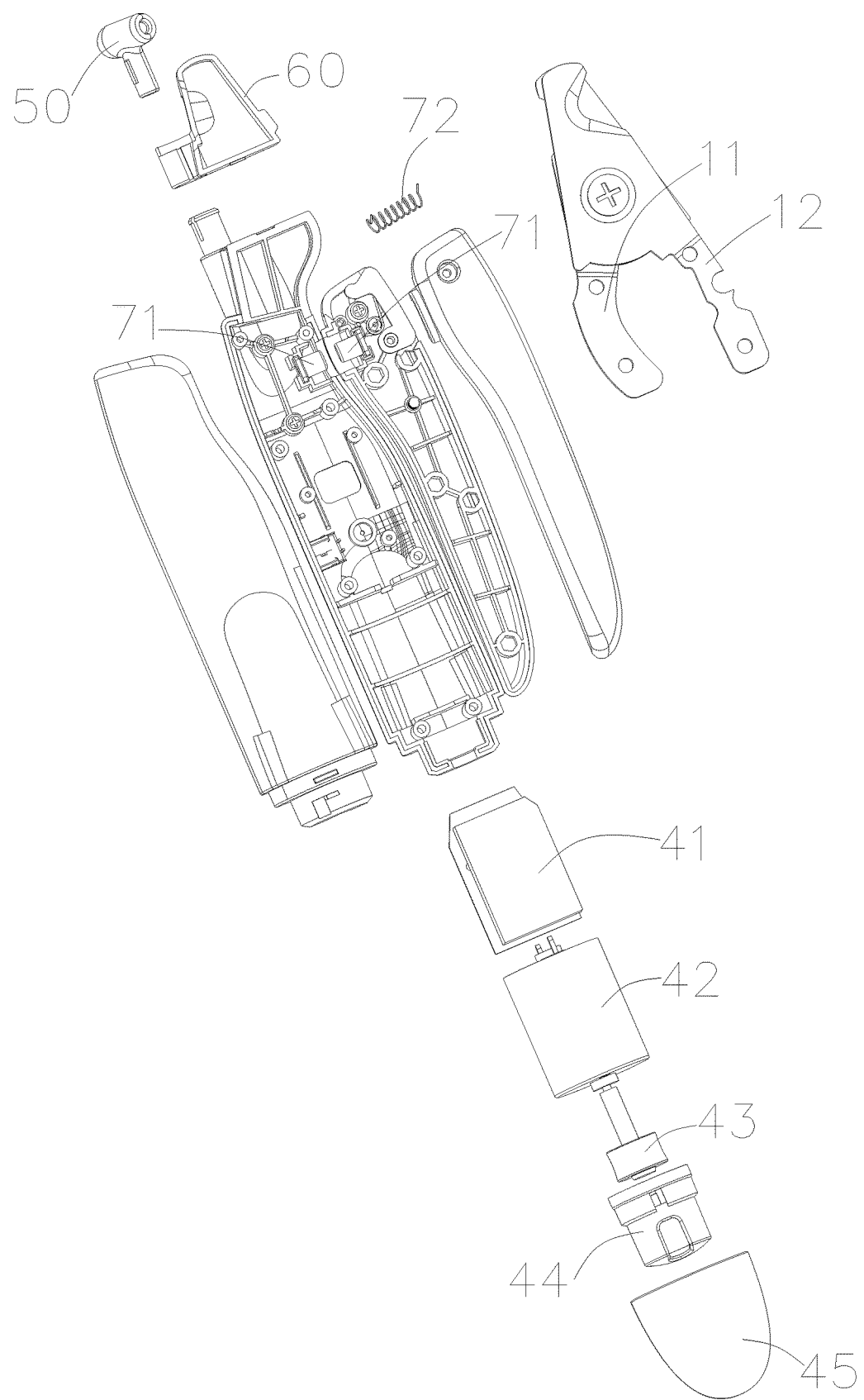
FIG. 2 is an exploded view of the multifunctional pet manicure device in FIG. 1.
Figure 3:
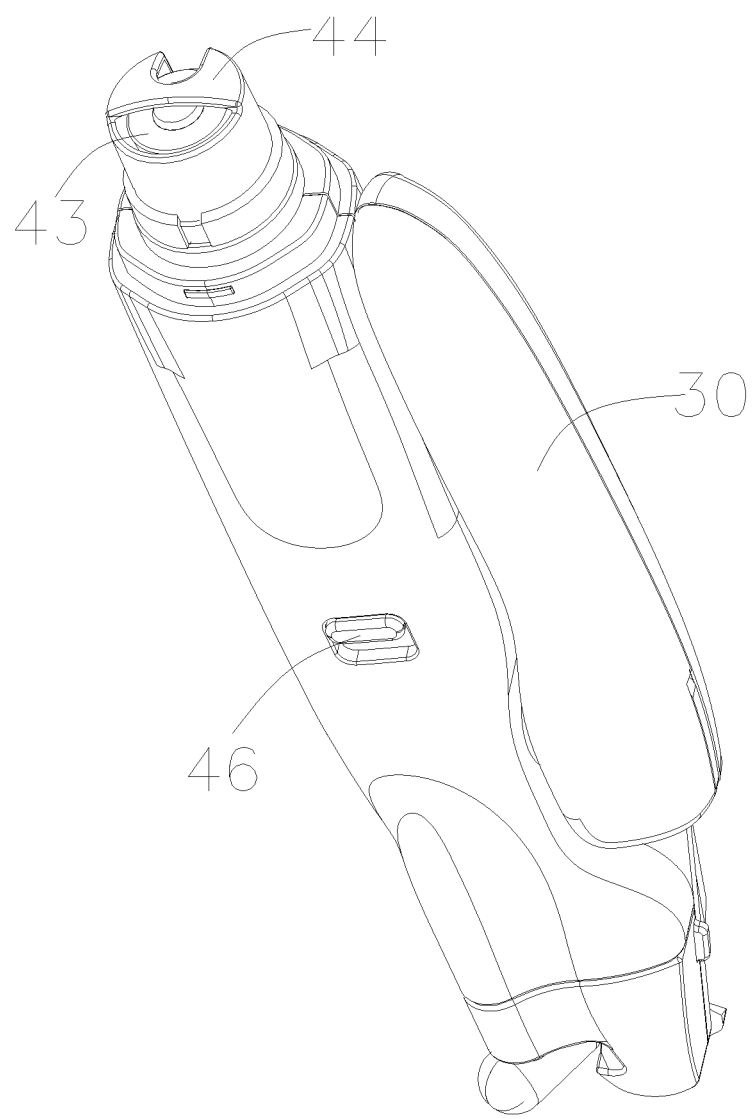
FIG. 3 is another perspective view of the multifunctional pet manicure device.
Figure 4:
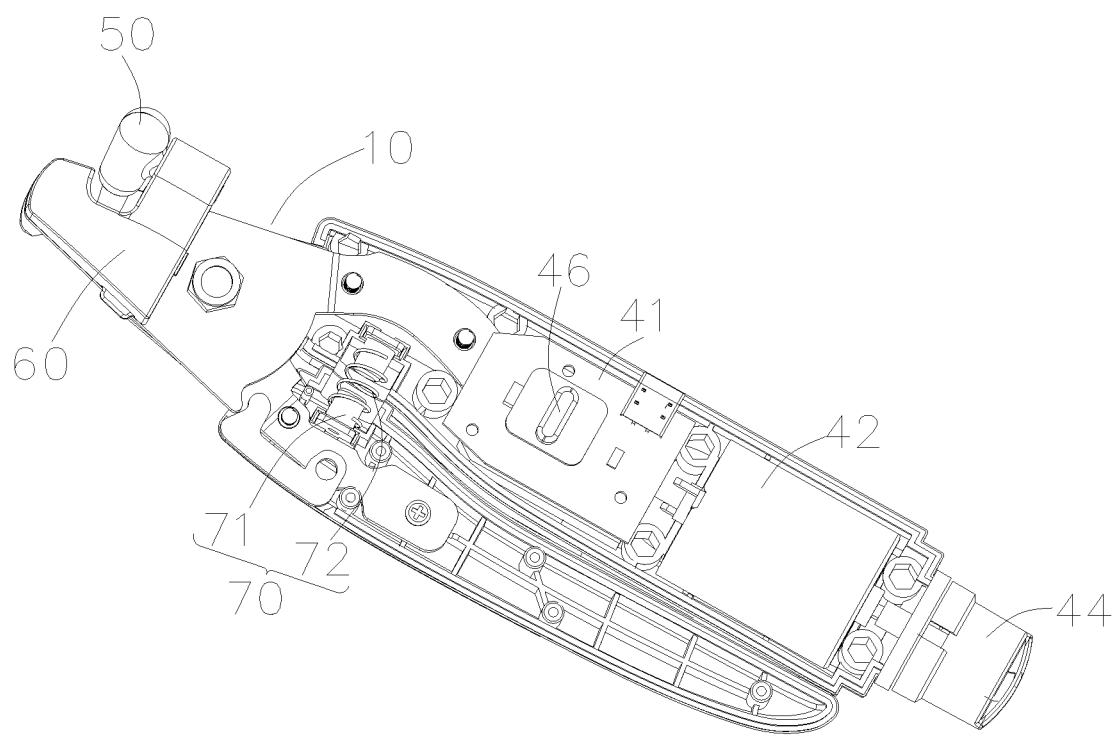
FIG. 4 is an internal structure view of the multifunctional pet manicure device in FIG. 1.

Referring to FIGS. 1 to 4, a multifunctional pet manicure device provided by the present invention includes a nail clipper 10, a main handle, a auxiliary handle 30, a nail polisher 40, a lamp 50, a nail collection box 60 and an elastic assembly 70.

The nail clipper 10 includes a first blade 11 and a second blade 12. The first blade 11 is rotationally connected with the second blade 12, one end of the first blade 11 and one end of the second blade 12 are knife edges or cutter edge, and the other end of the first blade 11 and the other end of the second blade 12 are provided with fixing holes.

The main handle 20 includes an upper housing and a lower housing; the upper housing and the lower housing are closed and fixed to form an accommodating chamber; and one end of the first blade 11 is accommodated within the main handle 20 and is fixed to the main handle 20 through the corresponding fixing hole.

The auxiliary handle 30 includes an upper housing and a lower housing; the upper housing and the lower housing are closed and fixed to form an accommodating chamber; and one end of the second blade 12 is accommodated into the auxiliary handle 30 and is fixed to the auxiliary handle 30 through the corresponding fixing hole.

The nail polisher 40 includes a battery 41, a driving member 42, a polishing head 43, a polishing head cover 44, a cover 45 and a switch 46. The battery 41 and the driving member 42 are electrically coupled to and are accommodated within the main handle 20. In the embodiment, the battery 41 is a lithium battery; the driving member 42 is a motor; the battery 41 is connected with a control panel, for example, a PCB (printed circuit board), which is connected with the switch 46; the switch 46 is mounted on the main handle 20 and used for controlling the polishing head 43 to be turned on and off through the control panel. The polishing head 43 is connected with an output shaft of the driving member 42, and the driving member 42 drives the polishing head 43 to rotate. The polishing head 43 extends out of the end of the main handle 20, and the polishing head cover 44 covers the polishing head 43 to prevent the polishing head 32 from accident damage. The cover 45 is detachably mounted to the end of the main handle 20; and the main handle 20 is provided with a USB charging port for charging the battery 41.

The lamp 50 is fixedly mounted at the end of the main handle 20 and is positioned on one side of one knife edge of the nail clipper 10; the lamp 50 is electrically coupled to the battery 41 and capable of lighting the nail-cutting part, and thus the vessels and nerves of the pets' toes can be seen and the pets' toes can be prevented from being cut and injured. In the embodiment, the lamp 50 uses an LED.

The nail collection box 60 is fixedly mounted at the end of the main handle 20 and is positioned below the knife edges of the nail clipper 10; and after being cut off by the knife edges of the first blade 11 and the second blade 12, the nails fall into the nail collection box 60 and are prevented from scattering and polluting the environment.

The elastic assembly 70 includes two positioning columns 71 and an elastic member 72; and the two positioning columns 71 are correspondingly mounted on the main handle 20 and the auxiliary handle 30. In the embodiment, the elastic member 72 is a spring; and two ends of the elastic member 72 correspondingly sleeve the two positioning columns 71, thus the main handle 20 and the auxiliary handle 30 are opened due to the elastic force, and the nail clipper 10 is in an open state.

When the multifunctional pet manicure device is used, the main handle 20 and the auxiliary handle 30 are held and squeezed, thus the nail clipper 10 can be operated to cut the nails; the lamp 50 can light the nail-cutting part, and thus the vessels and nerves of the pets' toes can be seen and the pets' toes can be prevented from being cut and injured. After being cut off, the nails can be accommodated within the nail collection box 60 and are prevented from scattering; and the nail polisher 40 can polish the nails. The whole multifunctional pet manicure device is convenient to use and carry.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A multifunctional pet manicure device comprising:
   a nail clipper;
   a main handle and an auxiliary handle;
   wherein the nail clipper comprises a first blade and a second blade, the first blade is rotationally connected with the second blade, the first blade is fixedly connected with the main handle, and the second blade is fixedly connected with the auxiliary handle, wherein the multifunctional pet manicure device further comprises a nail polisher comprising a driving member and a polishing head, wherein the polishing head is connected to the driving member, and the driving member drives the polishing head to rotate; wherein the multifunctional pet manicure device further comprises a nail collection box positioned on an end of the main handle and used for collecting the nails cut by the nail clipper; wherein the multifunctional pet manicure device further comprises an LED that is fixed to an end of the main handle and is capable of lighting the vessels and nerves of the pets' toes, to help prevent the pets' toes from being cut and injured; wherein the nail polisher further comprises a battery and a switch, the battery is accommodated within the main handle and is electrically connected with a driving member, and the switch is movably mounted to the main handle and is connected with the battery; wherein the battery is a lithium battery; and the main handle is provided with a USB charging port for charging the lithium battery; and wherein the multifunctional pet manicure device further comprises an electric assembly, the electric assembly comprises two positioning columns and an elastic member, the two positioning columns are correspondingly mounted to the main handle and the auxiliary handle, and two ends of the elastic member correspondingly sleeve the two positioning columns.

2. The multifunctional pet manicure device as claimed in claim 1, wherein the nail polisher comprises a polishing head cover used for accommodating the polishing head.

3. The multifunctional pet manicure device as claimed in claim 2, wherein the nail polisher comprises a cover which is detachably connected with the end of the main handle, and the polishing head cover is accommodated within the cover.

\* \* \* \* \*